United States Patent [19]

Parker

[11] Patent Number: 4,669,828
[45] Date of Patent: Jun. 2, 1987

[54] LIQUID CRYSTAL APPARATUS HAVING CONCEALED CONDUCTIVE PATHS

[75] Inventor: Robert Parker, Alamo, Calif.

[73] Assignee: Taliq Corporation, Mountain View, Calif.

[21] Appl. No.: 600,366

[22] Filed: Apr. 16, 1984

[51] Int. Cl.[4] ............................................. G02F 1/13
[52] U.S. Cl. ............................ 350/339 R; 350/347 V
[58] Field of Search ............................ 350/338, 339 R

[56] References Cited

U.S. PATENT DOCUMENTS 3,832,034  8/1974  Edmonds ....................... 350/339 F
4,435,047  3/1984  Fergason ........................... 350/334
4,552,437  11/1985  Gantenbrink et al. ......... 350/339 R Primary Examiner—John K. Corbin
Assistant Examiner—Richard F. Gallivan
Attorney, Agent, or Firm—Flehr, Hohbach, Test, Albritton & Herbert

[57] ABSTRACT

A liquid crystal apparatus comprising a nematic curvilinearly aligned phases liquid crystal material located between two electrode means. The apparatus includes electrically-conductive, non-transparent paths for energizing said electrode means to apply an electric field across the NCAP liquid crystal, and a coating means for concealing those portions of the conductive paths in a viewing area of the apparatus.

13 Claims, 3 Drawing Figures

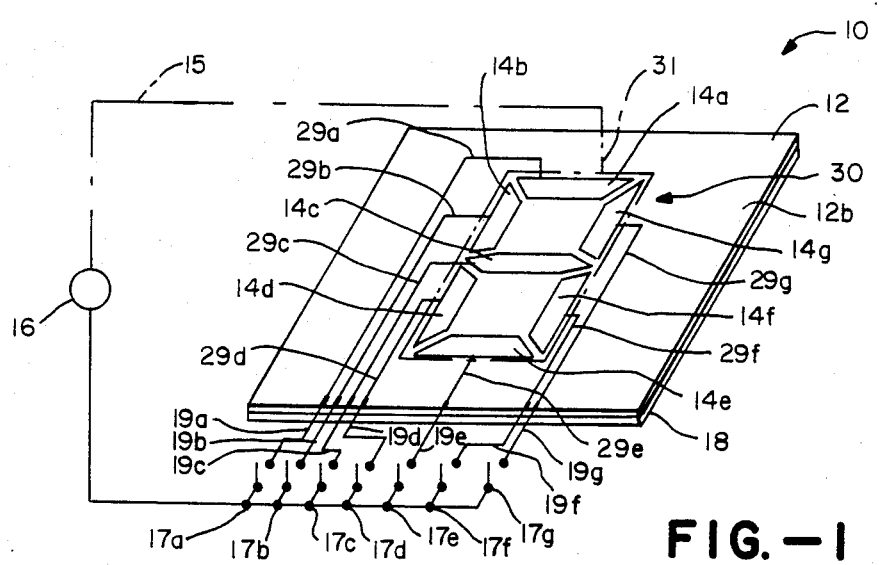
FIG.—1
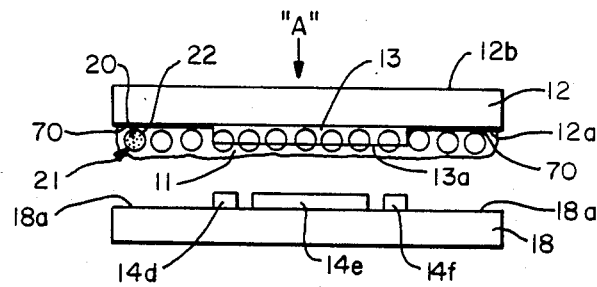
FIG.—2
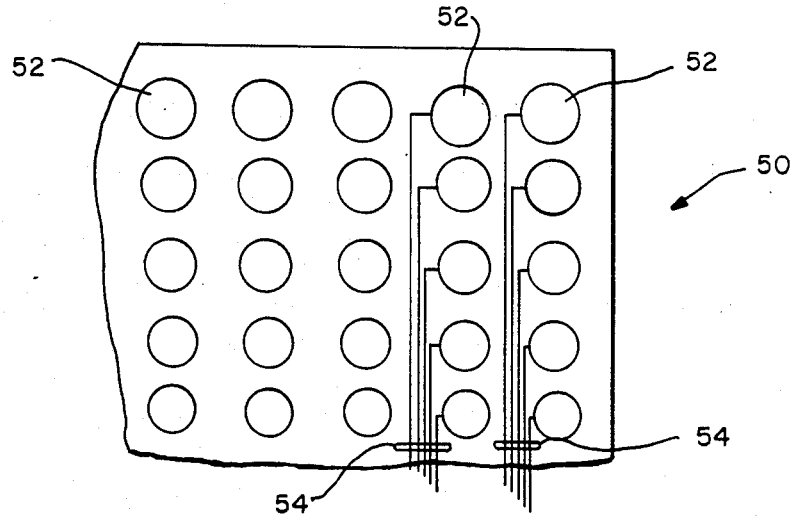
FIG.—3

LIQUID CRYSTAL APPARATUS HAVING CONCEALED CONDUCTIVE PATHS

The present invention relates generally to liquid crystal, and more particularly to a nematic curvilinearly aligned phases ("NCAP") liquid crystal apparatus having concealed conductive paths.

BACKGROUND OF THE INVENTION

Liquid crystals are used in a wide variety of devices, including visual display devices. The property of liquid crystals that enables them to be used, for example, in visual displays, is the ability of liquid crystals to transmit light on one hand, and to scatter light and/or to absorb it (especially when combined with an appropriate dye), on the other, depending on whether the liquid crystals are in a relatively free, that is de-energized or field-off state, or in a strictly aligned, that is energized or field-on state. An electric field selectively applied across the liquid crystals can be used to switch between field-off and field-on states.

There are three categories of liquid crystal materials, namely, cholesteric, nematic and smectic. The present invention relates in the preferred embodiment described hereinafter to the use of liquid crystal material which is operationally nematic. By "operationally nematic" is meant that, in the absence of external fields, structural distortion of the liquid crystal is dominated by the orientation of the liquid crystal and its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. A more detailed explanation of operationally nematic liquid crystal material is provided in co-pending U.S. patent application Ser. No. 477,242, filed Mar. 21, 1983, in the name of Fergason, entitled ENCAPSULATED LIQUID CRYSTAL AND METHOD, assigned to Manchester R&D Partnership, the disclosure of which is hereby incorporated by reference. Reference may also be made to co-pending U.S. patent application Ser. No. 302,780, filed Sept. 16, 1981, in the name of Fergason, entitled ENCAPSULATED LIQUID CRYSTAL AND METHOD, assigned to Manchester R&D Partnership, which disclosure is also hereby incorporated by reference.

However, it is to be understood that the various principles of the present invention may be employed with any of the various types of liquid crystal materials or combinations thereof, including combinations with dyes. Designation of the apparatus of the present invention as a NCAP liquid crystal apparatus or reference to NCAP liquid crystal is in no way intended to limit such apparatus to use with nematic liquid crystal materials. It is only for convenience sake and in an effort to use an abbreviated term that describes the present invention that reference is made to NCAP liquid crystal. Particularly, the term NCAP is used because the preferred liquid crystal material is nematic or operationally nematic liquid crystal and because in the field-off condition, or any other condition which results in the liquid crystal being in a distorted or randomly aligned state, the liquid crystal structure is distorted to a curved form (hence curvilinearly aligned) wherein the spatial average orientation of the liquid crystal material over a capsule-like volume, for instance, is strongly curved and there is no substantial parallel directional orientation of the liquid crystal in the absence of a prescribed input, for example, an electric field.

The present invention is particularly adapted for use with an apparatus using NCAP liquid crystal. NCAP liquid crystals and the method of making the same and devices using NCAP liquid crystals are described in detail in the above-identified U.S. patent application Ser. No. 302,780. Briefly, NCAP liquid crystal comprises a liquid crystal material that is more or less confined or contained in an encapsulating medium. A NCAP liquid crystal apparatus is an apparatus formed of NCAP liquid crystals that are capable of providing a function of the type typically inuring to a liquid crystal material. For example, such a NCAP liquid crystal apparatus may be a visual display device that responds to the application and removal of an electric field to effect a selected attenuation of visible light.

Such NCAP liquid crystal apparatus may commonly include NCAP liquid crystals positioned between two electrodes wherein the electrodes are located on respective substrates. Highly conductive, non-transparent electrical paths may connect the respective electrodes to a source of electrical power via a selectively closable switch or switches so that the NCAP liquid crystal material may be switched between a field-on and field-off state. In visual display devices, for reasons of aesthetics and to facilitate viewing of data, it is desirable that the conductive electrical paths be more or less invisible to one observing the display. For example, in a direct-driven, dot matrix-addressed display comprising numerous pixel elements, an electrical lead or conductive path has to be brought to each dot or pixel. The presence of so many leads in the viewing area of such a display would obviously detract from its appearance and interfere with a viewer's ability to read the display.

SUMMARY OF THE INVENTION

In view of the foregoing, an object of the present invention is to provide a NCAP liquid crystal apparatus having a relatively high quality of operation, including a display area that is aesthetically appealing and relatively easy to read to obtain information therefrom.

A more specific object of the present invention is to provide a NCAP liquid crystal apparatus display device having concealed conductive paths in the viewing area of the device.

As may be seen hereinafter, the NCAP liquid crystal apparatus disclosed herein is one which includes NCAP liquid crystal. NCAP liquid crystal comprises a liquid crystal material and containment means for inducing a generally non-parallel alignment of said liquid crystal material which is response to such alignment at least one of scatters and absorbs light and which in response to a prescribed input reduces the amount of such scattering or absorption.

The prescribed input is preferably of the electromagnetic type and, more particularly, an electric field. The apparatus may include at least two electrode means for applying the electric field. The electrode means may be located on opposite sides of the combination of the liquid crystal material and the containment means. Conductive electrical paths are provided to connect the respective electrode means to a source of electrical power for applying the electrical field across the combination of the liquid crystal material and the containment means. A coating means is also provided to conceal that part of the conductive paths in the viewing area of the apparatus. The coating means may be applied to a substrate that supports one of the electrode means and the combination of the liquid crystal material and the containment means. The coating means is preferably the same color as the combination of the liquid crystal material and the containment means in the absence of the electric field, that is, in the field-off or deenergized state.

BRIEF DESCRIPTION OF THE DRAWING FIGURES

The NCAP liquid crystal apparatus of the present invention will be described in more detail hereinafter in conjunction with the drawings wherein:

FIG. 1 is a schematic view illustrating a NCAP liquid crystal display device in accordance with the present invention;

FIG. 2 is an enlarged, schematic view of the NCAP liquid crystal display device along lines 2—2 of FIG. 1; and FIG. 3 is a schematic view of a NCAP liquid crystal dot matrix display device.

DETAILED DESCRIPTION OF THE PREFERRED EMBODIMENTS

Referring now to the drawings, attention is first directed to FIGS. 1 and 2. FIGS. 1 and 2 show a NCAP liquid crystal apparatus display device indicated generally by reference numeral 10. The apparatus includes a layer or layers of NCAP liquid crystal 11 supported on a substrate 12 having an electrode 13 located thereon. The apparatus may further comprise seven electrically isolated electrode segments 14a through 14g mounted on a substrate 18.

The NCAP liquid crystal 11 includes a liquid crystal material 20 more or less contained within the confines or the interior volume 21 of a capsule 22 or an encapsulating medium. The NCAP liquid crystal material comprises a plurality of such capsules or an encapsulating medium in which liquid crystal material is dispersed.

A quantity of liquid crystal material is confined or contained in volumes within the encapsulating medium, for example in a solid medium as individual capsules or dried stable emlusions. Such volumes may be discrete volumes, that is once formed, they ordinarily remain as individually distinct entities or separate entities. Such separate entities or discrete volumes, however, may also be interconnected, for example, by one or more passages. The liquid crystal material would preferably be in both the discrete volumes and in such interconnecting passages. Thus, the internal volumes of respective capsules may be fluidly coupled via one or more interconnecting passages. All of the aspects and features of the present invention vis-a-vis individual unconnected capsules have been found to be applicable to an arrangement of capsules that have one or more interconnecting passages.

As shown in FIG. 2, display device 10 may comprise a square cornered figure eight 30 on substrate 18. The figure eight 30 is divided into the seven electrically isolated segments 14a through 14g, each of which may be selectively energized to create various numerical characters. For example, energization of electrode segments 14f and 14g may display the numeral "1", and energization of electrode segments 14a, 14f and 14g may display the numeral "7". A conventional voltage source 16 is provided to energize selected segments of the display device. The device illustrated is a direct-drive display, as each electrode segment is directly coupled to the voltage source through a respective switch.

Particularly, electrodes 14a–14g are connected to electrically-conductive paths 29a through 29g, respectively, which are connected, by means well known in the art, to respective electrical leads 19a through 19g. Each lead 19a–19g is in turn connected to voltage source 16 through respective selectively closeable switches 17a–17g. Voltage source 16 may also be connected to electrode 13 by means of electrical lead 15 and an electrically conductive path 31. Thus, closing one switch selectively energizes only one electrode segment. For example, closing switch 17a will energize segment 14a, that is, a voltage will be applied across electrodes 13 and 14a and hence across NCAP liquid crystal 11.

When a selected switch is closed, apparatus 10 is in a field-on state with the molecules of the liquid crystal material in the desired alignment to permit the transmission of light. When a switch is open, apparatus 10 is in a field-off state such that the liquid crystal material scatters and/or absorbs light. The NCAP liquid material functions in this manner to attenuate or not to attenuate light incident thereon in dependence on whether an electric field is applied thereacross. As noted hereinabove, a more detailed description of NCAP liquid crystal is given in co-pending U.S. patent application Ser. No. 302,780, the disclosure of which has been incorporated by reference.

Mounting substrates 12 and 18, and electrodes 13 and 14a–14g may be optically transmissive so that liquid crystal apparatus 10 is capable of controlling the transmission of light therethrough in response to an electric field applied across the electrodes. Alternatively, electrodes 14a–14g and/or substrate 18 may be optically reflective or may have thereon an optically reflective coating so that reflection by such reflective coating or incident light will be a function of whether there is an electric field applied across the liquid crystal 11.

Preferably, a plurality of NCAP liquid crystals 11 are applied to substrate 12 in a manner such that they adhere to substrate 12 and electrode 13. The material of which capsule 22 is formed is suitable for binding or otherwise adhering the capsule to the substrate and electrode. In one embodiment, capsule 22 is formed of a polyvinyl alcohol (PVA). In the preferred embodiment, the liquid crystal material is dispersed or entrapped in a latex medium. In either embodiment, substrate 12 may be a flexible polyester film, such as Mylar ®, that has been precoated with a 90 to 5000 ohms per square, and preferably 450±15 ohms per square, layer of indium tin oxide (ITO). As illustrated in FIG. 2, the electrode coated surface of the polyester film 12 has been etched, as is well known in the art, so that only a portion of that surface has an ITO coating thereon. Particularly, electrode 13 may be formed to have a rectangular shape that approximates the outline of figure eight 30. Alternatively, electrode 13 could be configured to have the same pattern as electrode 14.

Materials other than ITO may be used to form the electrodes of the apparatus of the present invention. Additionally, it is noted that the greater the resistivity of the electrode coating, the more transparent is the film. However, a high resistance, electrode-coated film is more fragile than a film of lower resistance, as the high resistance film is thinner. A Mylar ® film with a precoated ITO electrode, known as Intrex, may be purchased from Sierracin of Sylmar, Calif.

As noted, latex entrapped NCAP liquid crystal is used in the preferred embodiment. Latex entrapped NCAP liquid crystal comprises the entrapment of liquid crystal in a latex medium. The latex is suspension of particles. The particles may be natural rubber or synthetic polymers or copolymers. A latex medium is formed by drying a suspension of such particles. A further explanation of latex entrapped NCAP liquid crystal and methods of making the same are provided in U.S. patent application Ser. No. 591,433, filed Mar. 20, 1984, in the name of Pearlman, entitled LATEX ENTRAPPED NCAP LIQUID CRYSTAL COMPOSITION, METHOD AND APPARATUS, assigned to the assignee of the present invention, and which disclosure is hereby incorporated by reference.

Briefly, latex entrapped NCAP liquid crystal may be formed by mixing a suspension of latex particles and liquid crystal material wherein the liquid crystal material has been previously emulsified in an aqueous soluble phase. Alternatively, all components may be combined prior to emulsifying the liquid crystal material. The mixture may then be applied to substrate 12 and electrode 13. As the mixture dries, it adheres to the electrode coated side of the polyester film. When dried, the latex particles form a latex medium with particles of liquid crystal dispersed therein.

A specific method of making latex entrapped NCAP liquid crystal may comprise first emulsifying 36 grams of the liquid crystal ROTN701 (manufactured by Hoffman La Roche of New York, N.Y.) in a solution containing 14 grams of a 12% aqeous solution of PVA and 1 gram of the surfactant TWEEN 20 (available through ICI Americas Incorporated of Wilmington, Del.). The liquid crystal is added continuously while the solution is mixed with an impeller blade at 3500 RPM. When the particle size of the liquid crystal is about 1-5 microns, 49 grams of Neorez R-967 (manufactured by Polyvinyl Chemical Industries, Wilmington, Mass.), containing 40% latex particles by weight, is added with slow mixing of less than 1000 RPM until the mixture is homogenous. This material may then be cast with a doctor blade or other suitable means onto substrate 12 and electrode 13.

After the NCAP liquid crystal material has dried on electrode 13 and substrate 12, substrate 18 and electrode 14 formed thereon may be laminated onto the surface of the latex entrapped NCAP liquid crystal. Substrate 18 may also be a flexible Mylar ® film precoated with a 90 to 5000 ohms per square, preferably a 450±150 ohms per square, layer of ITO to form electrode 14.

The electrode segments 14a-14g are formed by etching the electrode coated surface of film 18 to delineate the prescribed figure eight pattern 30. Other patterns for displaying other characters or information, of course, could be formed. Electrodes 14a-14g and Mylar ® film 18 are also preferably formed from the Intrex material.

Electrical leads 19a-19g are connected to the respective electrode segments 14a-14g by means of non-transparent, highly conductive electrical paths 29a-29g that are formed on the surface of substrate 18. Such conductive paths may be formed, as is well known in the art, by silk-screen printing techniques. Conductive paths 29a-29g are preferably about 0.0005" thick and 0.060" wide, and are comprised of silver. As such, the conductive paths are relatively small but highly conductive.

Conductive path 31 that connects electrode 13 to lead 15 is also a non-transparent, highly conductive electrical path similar to that of conductive paths 29a-29g.

As best illustrated in FIG. 1, the conductive paths 29a-29g and 31 are formed on substrates 12 and 18 to extend across the viewing area of display 10. Since the conductive paths are non-transparent, some means need be provided to conceal them from one observing the display so as to not to detract from the display's appearance or to interfere with the ability of an observer to read the display.

To this end, a coating means 70 is applied to the surface 12a of substrate 12 onto which the NCAP liquid crystal 11 is cast. The coating means 70 is applied to this surface to be contiguous with the boundary of electrode 13. It is not applied to the surface 13a of the electrode, as this would interfere with the function of the device since light then could not pass through electrode 13. In this embodiment, the coating means is applied to surface 12a prior to casting the NCAP liquid crystal material 11 thereon. Substrate 12 acts as a protective layer that protects the coating means as well as the NCAP liquid crystal from scarring and electrochemical deterioration, for example, oxidation or the like. The coating means is opaque to conceal conductive paths 29a-29g and 31. Preferably, the color of the coating means is substantially the same as the color of NCAP liquid crystal material 11 in the field-off state.

For example, the NCAP liquid crystal material may be made to include a 0.45% Sudan black B pleochoric dye added to a liquid crystal composed of aromatic esters. Such combined material is commercially sold by American Liquid Xtal Chemical Corp. of Kent, Ohio under the designation 8250. A NCAP liquid crystal display device made with the 8250 material will exhibit a black color in the field-off state, and change to nearly clear-transparent inthe field-on state. Therefore, in accordance with the present invention, coating means 70 may be a black paint that is applied to surface 12a to conceal those parts of the conductive paths in the viewing area of the display device. Thus, in the field-off state, the viewing area of the display device would appear black to one viewing the display in the direction of arrow "A", and in the field-on state, the energized electrode segments would appear clear and the rest of the viewing area black.

Alternatively, the NCAP liquid crystal material and apparatus may be configured to a display dark character or other information on a white or relatively bright background. In such a configuration, the liquid crystal material has a white or relatively bright appearance in the field-off state as light incident thereon is scattered to create this appearance. A dark character or characters may be established by locating a black or colored absorber behind the conductive segments 14a-14g wherein in the field-on state light is transmitted through the liquid crystal material such that an observer would see the color of the absorber at the location of the conductive segments that have an electric field applied thereto. In this arrangement, the color of the coating material 70 would then preferably be an opaque white or other suitable color that matches the appearance of the liquid crystal in the field-off state to thus conceal the conductive paths.

In an alternate embodiment, the coating means 70 may be applied to surface 12b of substrate 12. An appropriate mask may be used during the application of the coating means to insure that the coating means does not cover that portion of surface 12b aligned with electrode 13. The coating means may also be applied to surface 18a of substrate 18. The coating means would be applied to be contiguous with but not to extend across the electrodes 14a-14g forming the figure eight pattern 30. In this embodiment, the coating means would be preferably about one-tenth of a mil thick.

FIG. 3 illustrates a direct-drive, dot-addressed matrix display 50. The display comprises a plurality of dots or pixels 52 arranged in columns and rows. A row is enabled to accept display information in parallel via the column lines. Each dot includes a NCAP liquid crystal material located between a pair of electrode means. As display 50 is direct-driven, non-transparent, highly conductive electrical paths 54 (only some of which are illustrated) are provided to connect the electrode means of each dot via switching means, not illustrated, to a source of electrical power, also not illustrated. The present invention would find particular application with a dot-matrix display of the type shown in FIG. 3, as the coating means could be used to conceal from view the numerous conductive paths 54 in the viewing area of the display.

Although certain specific embodiments of the invention have been described herein in detail, the invention is not to be limited only to such embodiments, but rather only by the appended claims.

What is claimed is:

1. A liquid crystal apparatus, comprising:
   a liquid crystal material and containment means for inducing a distorted alignment of said liquid crystal material which in response to such alignment at least one of scatters and absorbs light and which in response to a prescribed input reduces the amount of scattering or absorption;
   application means for applying said prescribed input; and
   concealing means coextensive with a portion of the combination of the liquid crystal material and containment means for concealing from view that part of said application means in a viewing area of said liquid crystal apparatus, said concealing means not interfering with the function of said apparatus and having a color that substantially matches the appearance of the combination of said liquid crystal material and said containment means in the absence of said prescribed input.

2. The liquid crystal apparatus of claim 1 wherein said concealing means is a coating that is applied to at least that part of said application means in said viewing area.

3. A liquid crystal apparatus, comprising:
   a liquid crystal material and containment means for inducing a distorted alignment of said liquid crystal material which in response to such alignment at least one of scatters and absorbs light and which in response to an electric field reduces the amount of such scattering or absorption;
   electrode means for applying said electric field;
   an electrically conductive path for energizing said electrode means to apply said electric field; and
   means for concealing from view that part of said conductive path extending across a viewing area of said liquid crystal apparatus, said concealing means coextensive with a portion of the liquid crystal material and containment means, and said concealing means not interfering with the function of said apparatus and having a color that substantially matches the appearance of the combination of said liquid crystal material and said containment means in the absence of said prescribed input.

4. A liquid crystal apparatus, comprising:
   a liquid crystal material and containment means for inducing a distorted alignment of said liquid crystal material which in response to such alignment at least one of scatters and absorbs light and which in response to an electric field reduces the amount of such scattering or absorption;
   at least two electrode means for applying said electric field wherein the combination of said liquid crystal material and said containment means is located between said electrode means;
   electrically conductive paths for energizing said electrode means to apply said electric field; and
   means for coating those parts of said electrically conductive paths extending across a viewing area of said liquid crystal apparatus so as to conceal said parts of said conductive paths, said coating means coextensive with a portion of the combination of said liquid crystal material and said containment means, and said coating means having a color that is substantially the same as the color of the combination of said liquid crystal material and said containment means in the absence of said electric field.

5. The liquid crystal apparatus of claim 4 wherein said coating means is opaque.

6. A liquid crystal apparatus, comprising:
   a liquid crystal material and containment means for inducing a distorted alignment of said liquid crystal material which in response to such alignment at least one of scatters and absorbs light and which in response to an electric field reduces the amount of such scattering or absorption;
   a first substrate for supporting the combination of said liquid crystal material and said containment means;
   a first electrode means on said first substrate means for applying said electric field;
   a second electrode means on a second substrate on the side of the combination of said liquid crystal material and said containment means remote from said first substrate;
   electrically-conductive, non-transparent paths for energizing said first and second electrode means; and
   a coating means coextensive with a portion of the combination of said liquid crystal material and said containment means for covering those portions of said conductive paths extending between said first and second substrates so as to conceal from an observer of a display of the apparatus said portions of said conductive paths, said coating means not interfering with the function of said apparatus and having a color that substantially matches the appearance of the combination of said liquid crystal material and said containment means in the absence of an electric field.

7. The liquid crystal apparatus of claim 6 wherein said coating means is applied to said first substrate on a side thereof remote from the combination of said liquid crystal material and said surface means.

8. The liquid crystal apparatus of claim 6 wherein said coating means is applied to said first substrate on the side thereof on which the combination of said liquid crystal material and said surface means is supported.

9. The liquid crystal apparatus of claim 6 wherein said coating means is applied to said second substrate on a side thereof adjacent to the combination of said liquid crystal material and said surface means.

10. A liquid crystal apparatus display device, comprising:

a liquid crystal material and containment means for inducing a distorted alignment of said liquid crystal material which in response to such alignment at least one of scatters and absorbs light and which in response to an electric field reduces the amount of such scattering or absorption;

at least two electrode means for applying said electric field wherein the combination of said liquid crystal material and said containment means is located between said electrode means;

electrically conductive, non-transparent paths for energizing said electrode means to apply said electric field; and a coating means coextensive with the combination of said liquid crystal material and said containment means for concealing those portions of said conductive paths in a viewing area of said display device wherein the color of said coating means is substantially matches the appearance of the combination of said liquid crystal material and said containment means in the absence of said electric field.

11. A method of making a liquid crystal apparatus, comprising:

combining a liquid crystal material and containment means with an electrode means wherein said containment means effects the natural liquid crystal structure to induce a distorted alignment of said liquid crystal material which in response to such alignment at least one of scatters and absorbs light and which in response to an electric field reduces the amount of scattering or absorption;

providing at least one electrically conductive path to said electrode means for applying said electric field; and applying a coating coextensive with a portion of the combination of the liquid crystal material and containment means for concealing that part of said conductive path extending across a viewing area of said apparatus from view, said coating means not interfering with the function of said apparatus and having a color that is substantially the same as the color of the combination of the liquid crystal material and the containment means in the absence of said electric field.

12. A method of making a liquid crystal apparatus, comprising:

applying a liquid crystal material and containment means to a first electrode means wherein said containment means effects the natural liquid crystal structure to induce a distorted alignment of said liquid crystal material which in response to such alignment at least one of scatters and absorbs light and which in response to an electric field reduces the amount of such scattering or absorption;

applying a second electrode means on the side of said combination of said liquid crystal material and said containment means remote from said first electrode means;

extending at least one electrically conductive path to each of said first and second electrode means for applying said electric field; and applying a coating that is coextensive with a portion of said combination of said liquid crystal material and said containment means for concealing from view those portions of said conductive paths extending across a viewing area of said apparatus, said coating means not interfering with the function of said apparatus and having a color that is substantially the same as the color of said combination of said liquid crystal material and said containment means in the absence of said electric field.

13. A method for making a liquid crystal apparatus, comprising:

applying a liquid crystal material and containment means to a first electrode means wherein said containment means effects the natural liquid crystal structure to induce a distorted alignment of said liquid crystal material which in response to such alignment at least one of scatters and absorbs light and which in response to an electric field reduces the amount of such scattering or absorption;

applying a second electrode means on the side of said combination of said liquid crystal material and said containment means remote from said first electrode means;

extending at least one electrically-conductive, non-transparent path to each of said first and second electrode means for applying said electric field; and covering those portions of said conductive paths extending through a viewing area of said apparatus with a coating that is coextensive with at least a portion of said combination of said liquid crystal material and said containment means and said coating having a color that substantially matches the appearance of the combination of said liquid crystal material and said containment means in the absence of said electric field.

* * * * *